United States Patent [19]

Takamatsu et al.

[11] Patent Number: 5,394,269
[45] Date of Patent: Feb. 28, 1995

[54] REFLECTANCE REDUCING FILM AND METHOD OF FORMING SAME ON GLASS SUBSTRATE

[75] Inventors: Atsushi Takamatsu; Osamu Takahashi; Hiroaki Arai, all of Matsusaka, Japan

[73] Assignee: Central Glass Company, Ltd., Ube, Japan

[21] Appl. No.: 150,895

[22] Filed: Nov. 12, 1993

[30] Foreign Application Priority Data

Nov. 13, 1992 [JP] Japan .................................. 4-303711

[51] Int. Cl.⁶ ...................... C03C 17/25; B05D 3/02; B05D 5/06
[52] U.S. Cl. .................... 359/580; 359/601; 427/169; 427/165; 427/164; 427/226; 427/443.2; 428/428
[58] Field of Search ............ 427/169, 165, 164, 443.2, 427/226; 65/60.8; 428/428; 359/580, 601

[56] References Cited

U.S. PATENT DOCUMENTS

| | | | |
|---|---|---|---|
| 5,250,322 | 10/1993 | Takahashi et al. | 427/226 |
| 5,266,358 | 11/1993 | Uemura et al. | 427/376.2 |
| 5,268,196 | 12/1993 | Boulos et al. | 427/165 |

FOREIGN PATENT DOCUMENTS

| | | |
|---|---|---|
| 545258A1 | 11/1992 | European Pat. Off. . |
| 16-666 | 1/1941 | Japan . |
| 2-14300 | 4/1990 | Japan . |
| 3-23493 | 3/1991 | Japan . |

OTHER PUBLICATIONS

Patent Abstracts of Japan, vol. 17, No. 73 (C–1026) Feb. 15, 1993.
Patent Abstracts of Japan, vol. 14, No. 571 (C–790), Dec. 19, 1990.
Vorotilov et al, "Sol–gel silicon dioxide films", Thin Solid Films, 209 (1992) pp. 188–194.

*Primary Examiner*—Roy V. King
*Attorney, Agent, or Firm*—Keck, Mahin & Cate

[57] ABSTRACT

The invention relates to a reflectance reducing silicon dioxide film formed on a glass substrate by the sol-gel process. To make the film minutely rough, at least two sols are respectively prepared from at least one compound selected from the group consisting of silicon alkoxides and silicon acetylacetonates, such that polymers of the sols have different average molecular weights. Then, the at least two sols are mixed with a solvent so as to prepare a coating solution. The coating solution is applied to the glass substrate so as to form a sol film on the glass substrate. The thus coated glass substrate is heated so as to transform the sol film into a gel film. The gel film which is minutely rough is satisfactory in reflectance reduction.

14 Claims, 2 Drawing Sheets

REFLECTANCE REDUCING FILM AND METHOD OF FORMING SAME ON GLASS SUBSTRATE

BACKGROUND OF THE INVENTION

The present invention relates to a reflectance reducing film, and a method of forming the film on a glass substrate. The film-forming method belongs to the sol-gel process. The reflectance reducing film is suitable for application, for example, to architectural window glasses.

Hitherto, there have been various proposals to form a reflectance reducing film on a glass substrate surface.

For example, JP-B-41-666 discloses an etching composition containing hydrofluoric acid for the purpose of providing a glass substrate with a low reflectance. The glass substrate is etched with the etching composition for forming a reflectance reducing film or layer which is lower than the glass substrate in refractive index.

JP-B-2-14300 discloses a method of producing a reflectance reducing glass. In this method, a reflectance-reducing porous layer is formed by selectively removing components of a glass plate except silica. This removal is made by contacting the glass plate with a silica-supersaturated aqueous solution of hydrosilicofluoric acid.

However, the above-mentioned methods of producing a reflectance reducing glass are relatively complicated in production process. Therefore, it is necessary to spend a relatively long time to produce a reflectance reducing glass. Furthermore, in case that a large reflectance-reducing glass is produced, there is provided a problem of increased error in optical characteristics of the glass. Still furthermore, due to the use of hydrofluoric acid which is very hazardous against human body, the production process must be conducted very cautiously. This lowers the production efficiency.

Another example is forming a reflectance reducing film on a glass substrate by applying a metal alkoxide solution to which an organic polymer is added. The coated glass substrate is heated for thermally decomposing the organic polymer, thereby making the film minutely rough. However, this method has the following drawback.

After heating at a temperature not lower than about 400° C., micro-pits which make the film minutely rough tend to disappear by the densification of the film.

Still another example is forming a multilayer film on a glass substrate by alternately arranging at least one film having a high refractive index and at least one film having a low refractive index. However, the forming process is relatively complicated, thereby lowering the production efficiency. Furthermore, the multilayer film has a relatively high reflectance for the light which is obliquely incident on the multilayer film. Still furthermore, the coated glass substrate has a relatively high excitation purity, thereby causing glare.

JP-B-3-23493 discloses a low reflectance glass having a two-layered film formed thereon. The two-layered film comprises a first layer of a condensation product containing a metal oxide and a second layer of a condensation product of a fluorine-containing silicon compound. After forming the first layer on a glass substrate, the first layer is heated at a temperature ranging from 200° to 550° C. After forming the second layer on the first layer, the second layer is heated at a temperature ranging from 120° to 250° C. With this heating temperature of the second layer, the second layer becomes insufficient in hardness and strength.

SUMMARY OF THE INVENTION

It is therefore an object of the present invention to provide a reflectance reducing film formed on a glass substrate, which has a minutely rough surface, a good adherence to the glass substrate, a good weatherability and a good abrasion resistance.

It is another object of the present invention to provide an improved method of forming the reflectance reducing film on a glass substrate, which is free of the above-mentioned drawbacks.

According to a first aspect of the present invention, there is provided a method of forming on a glass substrate a silicon dioxide film having a thickness of about 60 to 160 nm and a refractive index of 1.21 to 1.40 and being minutely rough such that the film has numerous micro-pits and/or numerous microscopic islet-like land regions, at least one of each micro-pit and each islet-like land region having a diameter of 50 to 200 nm, the method comprising the steps of:

(a) preparing at least two sols respectively from at least one compound so as to disperse in said at least two sols at least two polymers of said at least one compound, said at least one compound being selected from the group consisting of silicon alkoxides and silicon acetylacetonates, said at least two polymers having different average molecular weights;

(b) mixing said at least two sols together with a solvent so as to prepare a coating solution;

(c) applying the coating solution to the glass substrate so as to form a sol film on the glass substrate; and (d) heating the glass substrate and the sol film so as to transform the sol film into a gel film which has a minutely rough surface having numerous micro-pits and numerous microscopic islet-like regions.

According to a second aspect of the present invention, there is provided a reflectance reducing silicon dioxide film formed on a glass substrate, the film having a thickness of about 60 to 160 nm and a refractive index of 1.21 to 1.40 and being minutely rough such that the film has numerous micro-pits and/or numerous microscopic islet-like land regions, at least one of each micro-pit and each islet-like land region having a diameter of 50 to 200 nm, the film being prepared in accordance with the above method.

Even if a glass substrate coated with the reflectance reducing film is baked at a high temperature, for example, not lower than 500° C., the surface condition which is minutely rough is stable.

DESCRIPTION OF THE PREFERRED EMBODIMENTS

Figure 1:
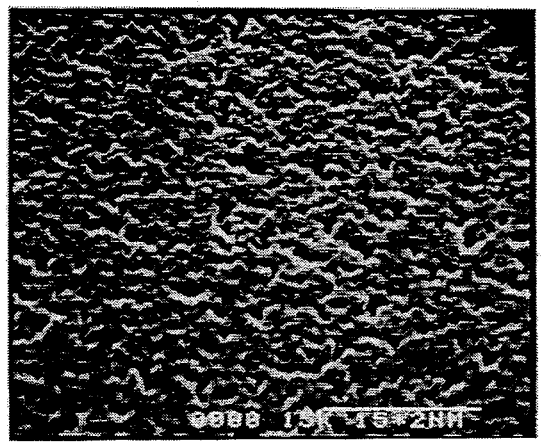
FIGS. 1, 2 and 3 are photographs taken through a scanning electron microscope (SEM) of about 20,000 magnifications, showing surface conditions of the reflectance reducing films formed on glass substrates in accordance with Examples 1 and 2 and Comparative Example 1 of the present invention, respectively.

A silicon alkoxide sol and/or a silicon acetylacetonate sol is used in the present invention for preparing the coating solution because of the following reasons.

The average molecular weight of polymer of each sol can be relatively easily controlled. Furthermore, a silicon oxide film made from a silicon alkoxide sol and/or a silicon acetylacetonate sol is high in transparency, hardness and durability. Still furthermore, a silicon alkoxide and a silicon acetylacetonate are relatively cheap in price and easily available.

A silicon alkoxide of the present invention may be either a simple alkoxide having no organic group other than alkoxyl group, such as a methoxide, an ethoxide, an isopropoxide or the like, or an alkyl alkoxide having at least one alkyl group besides alkoxyl group, such as a monomethylalkoxide or a monoethylalkoxide.

A silicon acetylacetonate of the present invention may be either a simple acetylacetonate having no organic group other than acetylacetone group, or an acetylalkoxyacetonate such as methylalkoxyacetonate or ethylalkoxyacetonate.

Examples of the silicon alkoxides and the silicon acetylacetonates are tetramethoxysilane, tetraethoxysilane, methyltriethoxysilane, methyltrimethoxysilane, dimethyldiethoxysilane and dimethyldimethoxysilane.

In the present invention, at least two sols are used for the purpose of making the reflectance reducing film minutely rough due to the existence of numerous micro-pits and numerous microscopic islet-like land regions. At least two kinds of polymers which are respectively dispersed in the at least two sols have different average molecular weights.

In the present invention, at least one compound selected from the group consisting of silicon alkoxides and silicon acetylacetonates is used for preparing the at least two sols.

In the present invention, it is preferable to use one sol containing the polymer having an average molecular weight ranging from about 800 to about 5,000 and more preferably from about 2,000 to about 3,000 and the other at least one sol containing the polymer having an average molecular weight ranging from about 50,000 to about 400,000.

The average molecular weights of the polymers can be relatively easily controlled by adjusting hydrolysis reaction or polycondensation reaction of a silicon alkoxide and/or a silicon acetylacetonate. In fact, this adjustment can be conducted by selecting a suitable catalyst, for example, from hydrochloric acid, nitric acid and acetic acid, and by controlling the amount of the catalyst, pH value, the reaction temperature, etc. It is preferable to use a pH value of a silicon alkoxide or silicon acetylacetonate sol, ranging from about 1 to about 6, more preferably from about 2 to about 4. The reaction temperature of hydrolysis and polycondensation preferably ranges from about 20° C. to about 80° C., and more preferably from 25° C. to about 70° C. It may be difficult to set fixed conditions with respect to the type of catalyst, pH value, the reaction temperature, etc. for different combinations of sols.

It is preferable to mix the above-mentioned one sol with the other at least one sol in the ratio of 1:10 to 30:1, more preferably from 1:1 to 20:1, by the number of moles of solute reduced to an oxide basis.

According to the present invention, the outer surface of the reflectance reducing film is made minutely rough such that the outer surface of the same is scattered with numerous micro-pits and numerous microscopic islet-like land regions. Each islet-like region is defined between adjacent micro-pits.

In the present invention, the average diameter of at least one of the islet-like land region and the micro-pit is in the range from about 50 to about 200 nm, and more preferably from about 100 to about 150 nm. If it is less than 50 nm, the reflectance reducing film is sufficient in strength but insufficient in reflectance reduction. If it is larger than 200 nm, the reflectance reducing film is markedly lowered in strength and too much lowered in refractive index.

In the present invention, the thickness of the reflectance reducing film is in a range from 60 to 160 nm. If it is out of this range, the reflectance reducing film becomes insufficient in strength and is not satisfactory in reflectance reduction.

In the present invention, the refractive index of the reflectance reducing film is in a range from 1.21 to 1.40, and more preferably from 1.30 to 1.40. If it is lower than 1.21, the reflectance reducing film becomes insufficient in strength. If it is higher than 1.40, the reflectance reducing film becomes insufficient in reflectance reduction.

It is preferable to adjust the relative humidity under which the coating solution is applied to the glass substrate, in the range from about 40 to about 90%. When relative humidities of about 40% and about 90% are taken in the present invention, the average diameters of at least one of the microscopic islet-like land region and the micro-pit become about 50 nm and about 200 nm, respectively.

It is preferable to have the coating solution having a concentration of a silicon alkoxide and/or a silicon acetylacetonate in an alcohol solution, in the range from 0.1 to 10 wt %. If the concentration is less than 0.1 wt %, it is difficult to make the reflectance reducing film uniformly and minutely rough. If the concentration is higher than 10 wt %, the solution becomes too viscous. This tends to form cracks on the surface of the reflectance reducing film. Examples of the alcohol solution are isopropyl alcohol and 1-butanol.

It is preferable to adjust viscosity of the coating solution in the range from 1 to 10 cP.

As the coating method, it is usual to use dip coating, spraying, flow coating or spin coating.

It is preferable to dry the sol film at a temperature not lower than 100° C. for a period not longer than about 30 min so as to transform the sol film into a gel film having a minutely rough surface.

It should be noted that the minutely rough surface condition, i.e. numerous micro-pits and numerous microscopic islet-like land regions, will not disappear even if the gel film is baked at a temperature not lower than 500° C.

A glass substrate according to the present invention may be colorless or colored as long as it is transparent. The glass substrate may be flat or curved in shape, or a tempered one.

The following examples are illustrative of the present invention, but these examples are not limitative.

EXAMPLE 1

A glass substrate was coated with a reflectance reducing film in accordance with the following steps.

Firstly, a clear float glass substrate about 100 mm square in widths and about 3 mm in thickness was washed with neutral detergent, then with water, and then dried. A methyltriethoxysilane solution (a first sol) was prepared, such that polymer in the sol had an average molecular weight of about 3,000 and a concentration of about 30 wt %. A silicon ethoxide solution (a second sol) was prepared, such that polymer in the sol had an average molecular weight of about 100,000 and a concentration of about 6 wt %. Then, about 20.0 g of the first sol and about 28.6 g of the second sol were mixed together with about 150 g of 1-butanol in a beaker so as to make a coating solution. The coating solution was stirred for about 8 hr, and then aged for about two weeks. In the coating solution, the molar ratio of the polymer of the first sol to the polymer of the second sol was about 3.5.

The coating solution was applied to both major surfaces of the glass substrate by dip coating in the atmosphere of a temperature of about 23° C. and a relative humidity of about 60%. In fact, the glass substrate was immersed in the coating solution, and then pulled up at a speed of about 2.3 mm/s. Then, the thus coated glass substrate was stationarily dried for about 3 min, and then heated at a temperature of about 270° C. for about 10 min. With this, a $SiO_2$ film (a gel film) was formed on the glass substrate. Then, the coated glass substrate was heated again at a temperature of about 550° C. for about 10 min.

As shown in FIG. 1, numerous micro-pits making the film minutely rough and porous were observed with SEM of about 20,000 magnifications. The diameter of the micro-pit was in a range from about 100 to about 150 nm. The film was about 1.33 in refractive index and about 105 nm in thickness.

Figure 4:
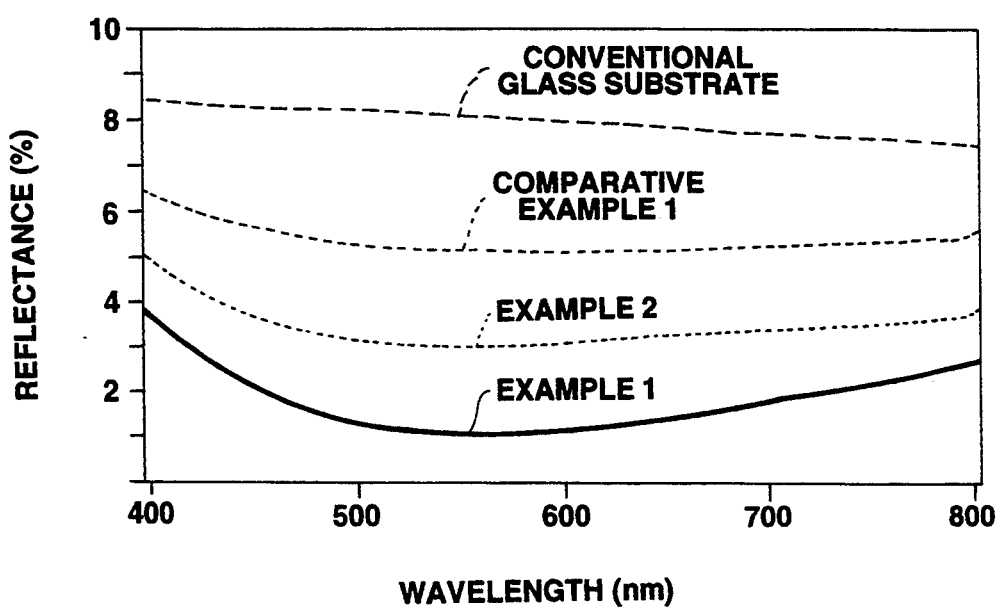
FIG. 4 is a graph showing reflectance spectrums with respect to reflectance reducing glass plates according to Examples 1 and 2, a coated glass plate according to Comparative Example 1 and a conventional uncoated glass plate.

As shown in FIG. 4, the reflectance spectrum of the coated glass substrate was measured in accordance with JIS Z8722. The result was about 1.1% at a wavelength of about 550 nm. The visible light reflectance (D65 light—Y value) was about 1.2%. The coated glass substrate was satisfactory in reflectance reduction and strength.

EXAMPLE 2

A coating process of Example 1 was repeated except that the glass substrate was pulled up from the coating solution at a speed of about 3 mm/s and that the coated glass substrate was heated at a temperature of about 600° C. for about 10 min after heating at a temperature of about 270° C. for about 10 min.

Figure 2:
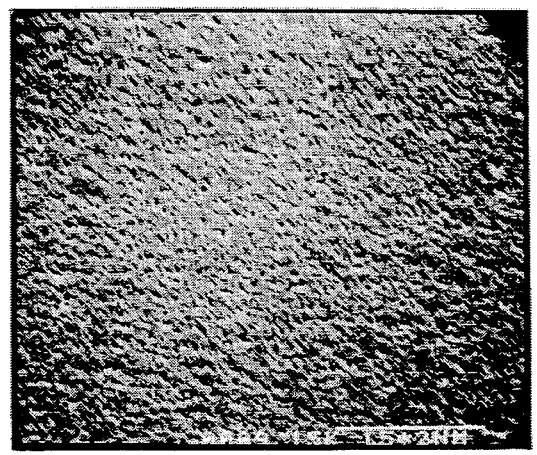

As shown in FIG. 2, densification of the film somewhat proceeded compared with the film of Example 1. However, numerous micro-pits making the film minutely rough and porous were observed with SEM of about 20,000 magnifications. The diameter of the micro-pits was about 100 nm. The film was about 1.395 in refractive index and about 100 nm in thickness.

As shown in FIG. 4, the reflectance of the coated glass substrate was about 3% at a wavelength of about 550 nm. The visible light reflectance (D65 light—Y value) was about 3.1%. The coated glass substrate was satisfactory in reflectance reduction.

Abrasion resistance was tested by the Taber test. In the test, the specimen was rotated 100 times under the abrasive wheels (CS-10F) to which a load of 500 gf was applied. The haze value ($\Delta H$) was about 0.8%. Therefore, the coated glass substrate was superior in abrasion resistance.

Comparative Example 1

The same glass substrate as that of Example 1 was washed and then dried in the same manner as that of Example 1. A silicon ethoxide solution (sol) was mixed with butanol so as to make a coating solution. In the coating solution, polymer had an average molecular weight of about 100,000 and the solute concentration was about 0.4 mol %.

The coating solution was applied to both major surfaces of the glass substrate by dip coating in the same atmosphere as that of Example 1. In fact, the glass substrate was immersed in the coating solution, and then pulled up at a speed of about 3.5 mm/s. Then, the thus coated glass substrate was dried and then heated in the same manner as that of Example 1.

Figure 3:
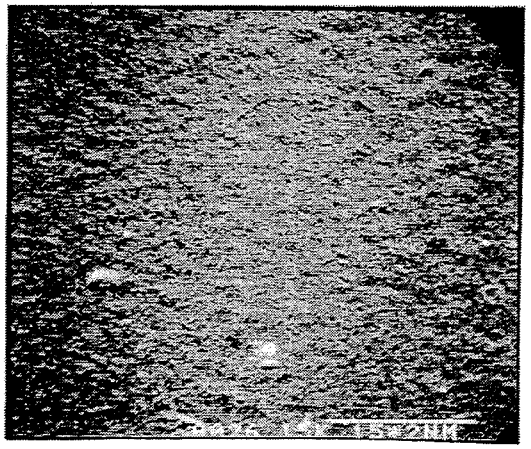

As shown in FIG. 3, the outer surface of the film was very flat through the observation with SEM of about 20,000 magnifications. The film was about 1.45 in refractive index and about 95 nm in thickness.

As shown in FIG. 4, the reflectance of the coated glass substrate was minimum at a wavelength of about 550 nm. The visible light reflectance (D65 light—Y value) was about 5.2%. Therefore, the coated glass substrate was insufficient in reflectance reduction.

Comparative Example 2

A coating process of Example 2 was repeated except that the glass substrate was pulled up from the coating solution at a speed of about 0.5 mm/s.

The obtained film was about 1.40 in refractive index and about 50 nm in thickness. The surface condition of the film was similar to that of Example 2. The reflectance of the coated glass substrate was minimum at a wavelength not higher than 400 nm. The visible light reflectance (D65 light—Y value) was about 5.7%. Therefore, the coated glass substrate was insufficient in reflectance reduction.

Comparative Example 3

A coating process of Example 2 was repeated except that the glass substrate was pulled up from the coating solution at a speed of about 6 mm/s.

The obtained film was about 1.39 in refractive index and about 170 nm in thickness. The surface condition of the film was similar to that of Example 2. The reflectance of the coated glass substrate was minimum at a wavelength not lower than 780 nm. The visible light reflectance (D65 light—Y value) was about 7.1%. Therefore, the coated glass substrate was insufficient in reflectance reduction.

Comparative Example 4

A coating process of Example 1 was repeated except that about 50 g of 1-butanol was added to a coating solution according to Example 1 so as to prepare a coating solution according to Comparative Example 4 and that the glass substrate was pulled up from the coating solution at a speed of about 1 mm/s.

The obtained film was about 1.33 in refractive index and about 50 nm in thickness. The surface condition of the film was similar to that of Example 1. The reflectance of the coated glass substrate was minimum at a wavelength not higher than 400 nm. The visible light reflectance (D65 light—Y value) was about 5%. Therefore, the coated glass substrate was insufficient in reflectance reduction.

Comparative Example 5

A coating process of Example 1 was repeated except that the glass substrate was pulled up from the coating solution at a speed of about 8 mm/s.

The obtained film was about 1.33 in refractive index and about 180 nm in thickness. The surface condition of the film was similar to that of Example 1. The reflectance of the coated glass substrate was minimum at a wavelength not lower than 780 nm. The visible light reflectance (D65 light—Y value) was about 6.9%. Therefore, the coated glass substrate was insufficient in reflectance reduction.

What is claimed is:

1. A method of forming on a glass substrate a silicon dioxide film having a thickness of about 60 to 160 nm and a refractive index of 1.21 to 1.40 and being minutely rough such that the film has micro-pits and/or microscopic land regions, at least one of each micro-pit and each land region having a diameter of 50 to 200 nm, the method comprising the steps of:
    (a) preparing at least two sols respectively from at least one compound so as to disperse in said at least two sols at least two polymers of said at least one compound, said at least one compound being selected from the group consisting of silicon alkoxides and silicon acetylacetonates, said at least two polymers having different average molecular weights;
    (b) mixing said at least two sols together with a solvent so as to prepare a coating solution;
    (c) applying the coating solution to the glass substrate so as to form a sol film on the glass substrate; and
    (d) heating the glass substrate and the sol film so as to transform the sol film into a gel film which has a minutely rough surface having micro-pits and/or microscopic land regions.

2. A method according to claim 1, wherein one polymer of said at least two polymers has an average molecular weight ranging from about 800 to about 5,000, and the other at least one polymer of said at least two polymers has an average molecular weight ranging from about 50,000 to about 400,000.

3. A method according to claim 2, wherein said one polymer has an average molecular weight ranging from about 2,000 to about 3,000.

4. A method according to claim 1, wherein at step (b) said one polymer and the other at least one polymer are mixed in the ratio of 1:10 to 30:1 by the number of moles reduced to an oxide basis.

5. A method according to claim 1, wherein said solvent is an alcohol solution.

6. A method according to claim 5, wherein said solvent is one selected from the group consisting of isopropyl alcohol and 1-butanol.

7. A method according to claim 1, wherein the glass substrate is heated at step (d) at a temperature not lower than 100° C.

8. A method according to claim 1, wherein at step (b) the viscosity of the coating solution is adjusted to 1–10 centipoises.

9. A method according to claim 1, wherein at step (b) the concentration of said at least two polymers reduced to an oxide basis in the coating solution is in the range from 0.1 to 10 wt %.

10. A method according to claim 1, wherein at step (c) the coating solution is applied to the glass substrate in an atmosphere having a relative humidity ranging from 40 to 90%.

11. A reflectance reducing silicon dioxide film formed on a glass substrate, the film having a thickness of about 60 to 160 nm and a refractive index of 1.21 to 1.40 and being minutely rough such that the film has micro-pits and/or microscopic land regions, at least one of each micro-pit and each land region having a diameter of 50 to 200 nm, the film being prepared in accordance with the method of claim 1.

12. A method according to claim 1, wherein each land region is defined between adjacent micro-pits.

13. A film according to claim 11, wherein each land region is defined between adjacent micro-pits.

14. A film according to claim 11, wherein micro-pits and land regions are stable when the film is baked at a temperature not lower than 500° C.

* * * * *